(12) United States Patent
Nakatsuji

(10) Patent No.: US 9,703,246 B2
(45) Date of Patent: Jul. 11, 2017

(54) IMAGE FORMING APPARATUS

(71) Applicant: KYOCERA Document Solutions Inc., Osaka (JP)

(72) Inventor: Hiroomi Nakatsuji, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/244,935

(22) Filed: Aug. 23, 2016

(65) Prior Publication Data

US 2017/0060064 A1    Mar. 2, 2017

(30) Foreign Application Priority Data

Aug. 25, 2015   (JP) ................................. 2015-166287

(51) Int. Cl.
    *G03G 15/00* (2006.01)
(52) U.S. Cl.
    CPC ............................. *G03G 15/5058* (2013.01)
(58) Field of Classification Search
    USPC .......................... 399/38, 42, 46, 49, 72, 301
    See application file for complete search history.

(56) References Cited

U.S. PATENT DOCUMENTS

| | | | | |
|---|---|---|---|---|
| 6,389,240 B2* | 5/2002 | Toyohara | ........... | G03G 15/5062 399/38 |
| 6,785,480 B2* | 8/2004 | Toyohara | ........... | G03G 15/5058 399/394 |
| 8,508,800 B2* | 8/2013 | Abe | ................... | G03G 15/0131 345/589 |
| 8,639,136 B2* | 1/2014 | Tomura | .............. | G03G 15/0189 399/396 |

FOREIGN PATENT DOCUMENTS

JP         2015-39108        2/2015

* cited by examiner

*Primary Examiner* — Hoan Tran

(57) ABSTRACT

A differential correction data generating unit measures two density characteristics at a reference linear velocity and another linear velocity from scanned images of two test charts printed at the reference linear velocity and the another linear velocity, and generates differential correction data as a difference between correction amounts for the measured two density characteristics. A correction amount adjusting unit measures a density characteristic at the reference linear velocity from an adjustment toner pattern formed on an intermediate transfer member, and thereby adjusts a correction amount for the density characteristic at the reference linear velocity. A density characteristic of a printing image is corrected, (a) for the reference linear velocity, on the basis of the correction amount at the reference linear velocity, and (b) for the another linear velocity, on the basis of the correction amount at the reference linear velocity and the differential correction data.

4 Claims, 9 Drawing Sheets

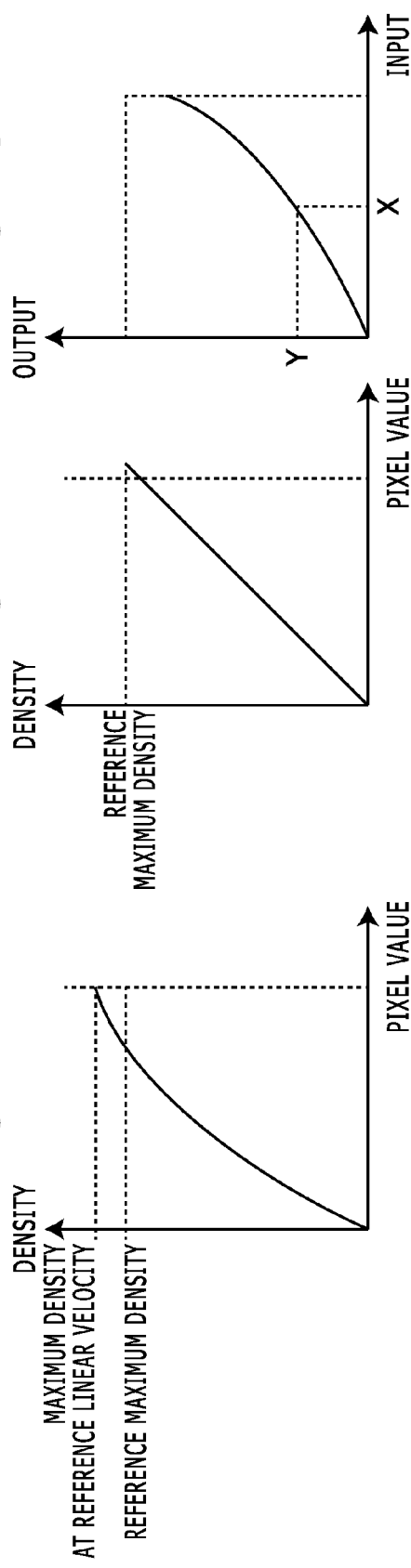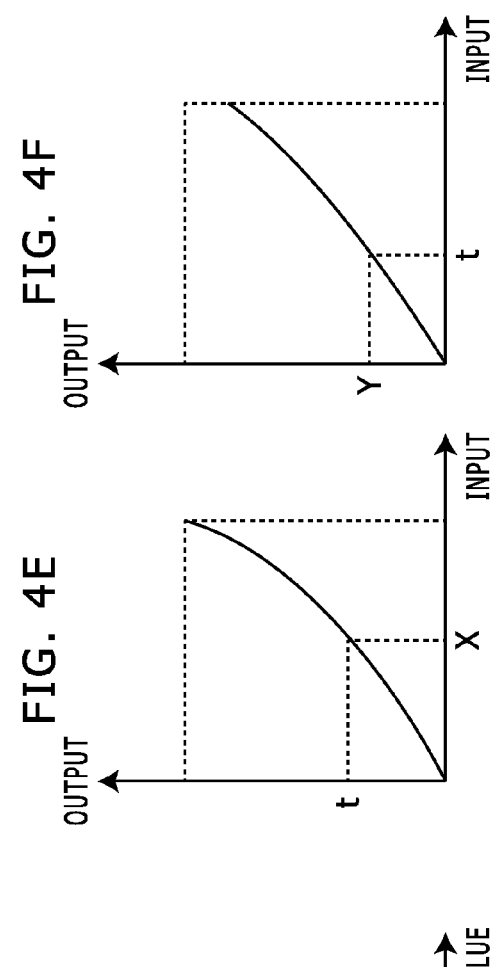

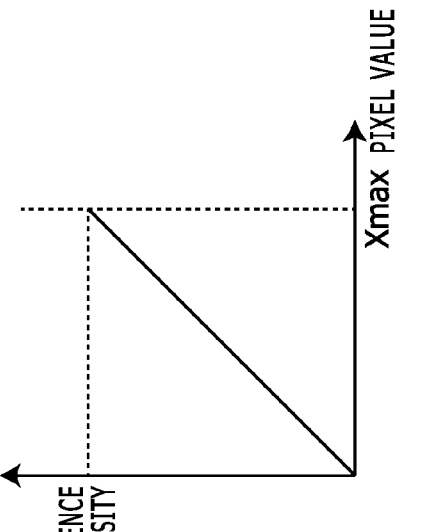
FIG. 8A
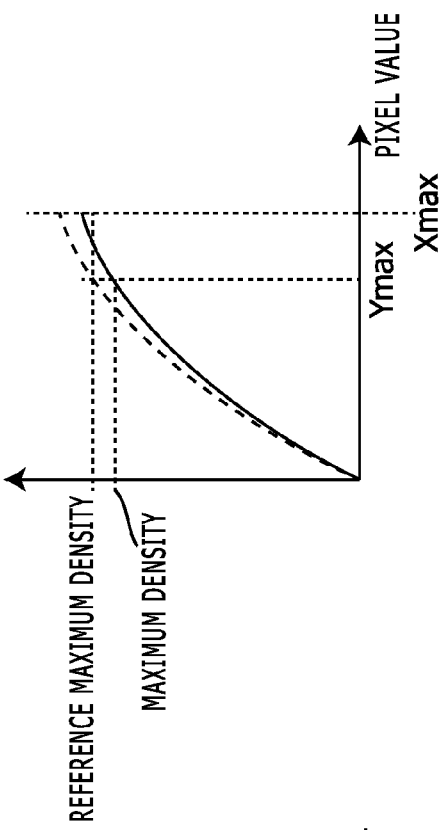
FIG. 8B
FIG. 8D
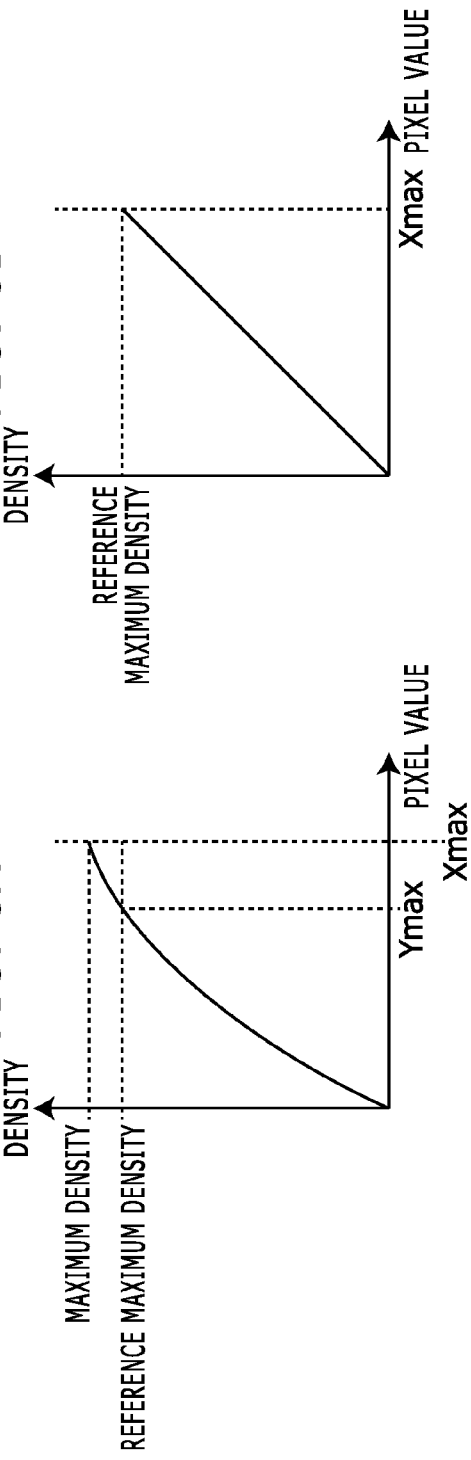
FIG. 8C
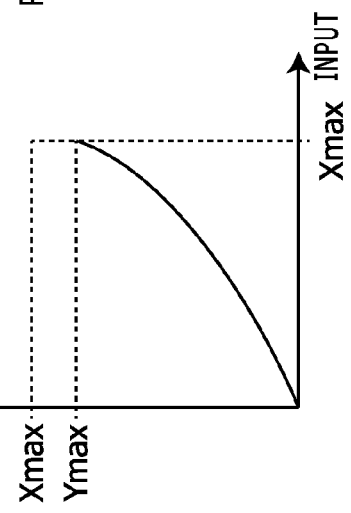

IMAGE FORMING APPARATUS

CROSS-REFERENCE TO RELATED APPLICATIONS

This application relates to and claims priority rights from Japanese Patent Application No. 2015-166287, filed on Aug. 25, 2015, the entire disclosures of which are hereby incorporated by reference herein.

BACKGROUND

1. Field of the Present Disclosure

The present disclosure relates to an image forming apparatus.

2. Description of the Related Art

In general, in an electrographic image forming apparatus, even if dots are increased in accordance with a pixel value in an image, a toner density is not in proportion to the pixel value.

Further, a relationship between the pixel value and the toner density varies due to an individual difference of image forming apparatuses, an environmental condition and the like, and therefore it is required to adjust the density characteristic of each individual apparatus in order to perform printing with a toner density proportional to a pixel value.

In a density adjustment method, an image forming apparatus prints a test chart on a paper sheet, scans the test chart printed on the paper sheet using a scanner or the like, and generates gradation correction data on the basis of the scan result. However, in this method, manual operations for the printing and the scanning of the test chart are bothersome, and therefore, an image forming apparatus often automatically adjusts the gradation correction data at regular intervals. In such a case, the image forming apparatus forms an adjustment toner pattern on an intermediate transfer member, measures a density of the adjustment toner pattern using a density sensor, and adjusts the gradation correction data on the basis of the measurement result.

In case of adjusting the gradation correction data on the basis of the measurement result of the density of the adjustment toner pattern on the intermediate transfer member, the adjustment toner patter is formed on the basis of a corrected pixel value using the gradation correction data before the adjustment thereof; and consequently, when reducing a toner density due to aging or the like, even though the density adjustment is performed, a maximum density of the toner density sometimes does not reach to a reference maximum density (e.g. ID (Image Density)=1.4).

FIGS. 8A to 8D show diagrams that explain adjustment of gradation correction data. FIG. 8A shows a diagram that indicates an example of a relationship between a pixel value and a toner density when generating gradation correction data by using a test chart. FIG. 8B shows a diagram that indicates a goal relationship between a pixel value and a toner density. FIG. 8C shows a diagram that indicates gradation correction data obtained from the relationship between a pixel value and a toner density shown in FIG. 8A and the goal relationship shown in FIG. 8B. FIG. 8D shows a diagram that indicates a relationship between a pixel value and a toner density after the density characteristic changes.

For example, in the density characteristic shown in FIG. 8A, if the gradation correction data is generated so that (a) the toner density gets a reference maximum density at a maximum value Xmax of a pixel value (e.g. 255 for 8 bit data) and (b) a toner density is in proportion to a pixel value, then the gradation correction data is as shown in FIG. 8C.

Afterward, when the density characteristic varies as shown by the solid line in FIG. 8D and the density decreases from the characteristic shown in FIG. 8A (i.e. the dashed line in FIG. 8D), if an adjustment toner pattern is generated using the gradation correction data shown in FIG. 8C, then as shown in FIG. 8D, the density at Ymax corresponding to the maximum value Xmax of a pixel value (i.e. a maximum density after the gradation correction) gets smaller than the reference maximum density.

In order to solve the aforementioned problem, in an image forming apparatus, a correction data generating unit (a) measures a density characteristic, (b) generates temporary gradation correction data so as to convert a maximum density of the density characteristic to a reference maximum density lower than the maximum density and make the density characteristic linear, (c) generates basic gradation correction data so as to make the density characteristic linear with keeping the maximum density of the density characteristic, and (d) generates additional gradation correction data used for additional gradation correction performed after gradation correction based on the basic gradation correction data so that gradation correction based on the basic gradation correction data and the additional gradation correction data gets the same as gradation correction based on the temporary gradation correction data; and an image processing unit performs gradation correction of a printing image on the basis of the basic gradation correction data and the additional gradation correction data. Consequently, the obtained correction data can be used up to the reference maximum density, even if the density characteristic varies due to adjustment of the additional gradation correction data.

In an image forming apparatus capable of printing at plural printing resolutions, the printing is performed at any one of plural different process linear velocities (printing linear velocities of full speed, half speed, ¼ speed and the like) corresponding to the plural printing resolutions.

Different process linear velocities result in different density characteristics (i.e. maximum densities and gradations in an image), and therefore when performing calibration to adjust the density characteristic, it is required to perform calibration plural times for plural process linear velocities; and however long time is required to perform the calibration for plural process linear velocities, and therefore it is not practical.

Therefore, in general, calibration is performed at a reference linear velocity, and an adjustment amount obtained by the calibration is also applied to a density characteristic at another linear velocity.

However, when applying the adjustment amount obtained by the calibration at the reference linear velocity to a density characteristic at another linear velocity, the density characteristic at another linear velocity may not be properly adjusted.

FIG. 9 shows a diagram that indicates an example of density characteristics at plural linear velocities. For example, as shown in FIG. 9, if due to aging, a maximum density at a reference linear velocity (here, full speed) corresponding to 600 dpi exceeds a reference maximum density, but a maximum density at a linear velocity (here, half speed) corresponding to 1200 dpi is less than the reference maximum density, then in the calibration at the reference linear velocity, the density characteristic at the reference linear velocity is adjusted so as to improperly decrease an image density. In this situation, if an adjustment amount obtained by the calibration of the density characteristic at the reference linear velocity corresponding to 600 dpi is applied to the density characteristic at the linear velocity corresponding to 1200 dpi, then despite the maximum density less than the reference maximum density, the density characteristic at this linear velocity is adjusted so as to improperly decrease an image density and consequently the maximum density improperly gets much lower than the reference maximum density.

SUMMARY

An image forming apparatus according to an aspect of the present disclosure includes a printing device capable of printing at plural linear velocities, an image scanning device, a differential correction data generating unit, a correction amount adjusting unit, and a density characteristic correcting unit. The differential correction data generating unit is configured to (a) cause the printing device to print a test chart at a reference linear velocity among the plural linear velocities and a test chart at another linear velocity among the plural linear velocities, (b) cause the image scanning device to scan images of the printed test charts, (c) measure a density characteristic at the reference linear velocity and a density characteristic at the another linear velocity on the basis of the scanning result of the images of the test charts, and (d) generate differential correction data on the basis of the density characteristic at the reference linear velocity and the density characteristic at the another linear velocity, the differential correction data being a difference between a correction amount for the density characteristic at the reference linear velocity and a correction amount for the density characteristic at the another linear velocity. The correction amount adjusting unit is configured to (a) form an adjustment toner pattern at the reference linear velocity on an intermediate transfer member in the printing device, (b) measure a density of the adjustment toner pattern formed on the intermediate transfer member using a density sensor in the printing device and thereby measure a density characteristic at the reference linear velocity, and (c) adjust a correction amount for the density characteristic at the reference linear velocity on the basis of the measured density characteristic at the reference linear velocity. The density characteristic correcting unit is configured to (a) for printing at the reference linear velocity, perform correction of a density characteristic of a printing image on the basis of the correction amount at the reference linear velocity, and (b) for printing at the another linear velocity, perform correction of a density characteristic of a printing image on the basis of the correction amount at the reference linear velocity and the differential correction data.

These and other objects, features and advantages of the present disclosure will become more apparent upon reading of the following detailed description along with the accompanied drawings.

BRIEF DESCRIPTION OF THE DRAWINGS

FIGS. 4A to 4F show diagrams that explain a process performed by the image forming apparatus shown in FIGS. 1 and 2 when generating gradation correction data at a reference linear velocity;

FIGS. 8A to 8D show diagrams that explain adjustment of gradation correction data.

DETAILED DESCRIPTION

Hereinafter, an embodiment according to an aspect of the present disclosure will be explained with reference to drawings.

Figure 1:
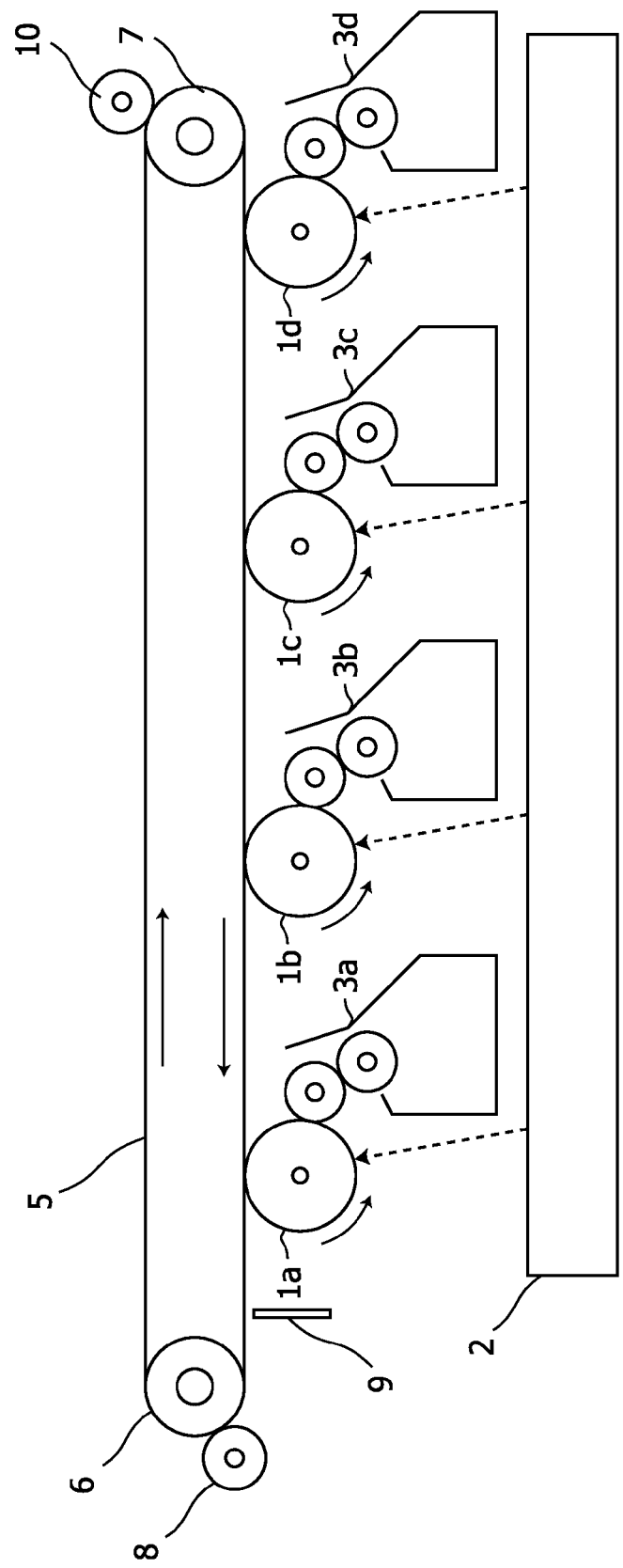
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. This image forming apparatus is an apparatus having a printing function such as a printer, a facsimile machine, a copier, or a multi function peripheral.

The image forming apparatus in the present embodiment includes a tandem-type color development device. This color development device includes photoconductor drums $1a$ to $1d$, an exposure device 2, and development devices $3a$ to $3d$. The photoconductor drums $1a$ to $1d$ are four color photoconductors of Black, Magenta, Cyan and Yellow. The exposure device 2 is a device that irradiates laser light to the photoconductor drums $1a$ to $1d$ and thereby forms an electrostatic latent image. The exposure device 2 includes a laser diode as a light source of the laser light, optical elements (such as a lens, a mirror and a polygon mirror that scans light along a primary scanning direction on a surface of the photoconductor drums $1a$ to $1d$) that guide the laser light to the photoconductor drums $1a$ to $1d$, a polygon motor that rotates the polygon mirror, and the like.

The development devices $3a$ to $3d$ attach toner in toner cartridges to electrostatic latent images on the photoconductor drums $1a$ to $1d$, and thereby form toner images. The photoconductor drum $1a$ and the development device $3a$ perform development of Black. The photoconductor drum $1b$ and the development device $3b$ perform development of Magenta. The photoconductor drum $1c$ and the development device $3c$ perform development of Cyan. The photoconductor drum $1d$ and the development device $3d$ perform development of Yellow.

The intermediate transfer belt 5 is a loop-shaped intermediate transfer member that contacts the photoconductor drums $1a$ to $1d$. Toner images on the photoconductor drums $1a$ to $1d$ are primarily transferred onto the intermediate transfer belt 5. The intermediate transfer belt 5 is hitched around a driving roller 6 and a tension roller 7, and rotates by driving force of the driving roller 6 towards the direction from the contact position with the photoconductor drum $1d$ to the contact position with the photoconductor drum $1a$.

A transfer roller 8 makes a conveyed paper sheet contact the transfer belt 5, and secondarily transfers the toner image on the transfer belt 5 to a paper sheet. The paper sheet on which the toner image has been transferred is conveyed to an unshown fuser, and consequently, the toner image is fixed on the paper sheet.

A density sensor 9 irradiates light to the intermediate transfer belt 5 and detects its reflection light. In particular, in an adjustment process of a density characteristic (i.e. a characteristic of a toner density corresponding to a pixel value in image data), the density sensor 9 detects a density, a position and the like of an adjustment toner pattern on the intermediate transfer belt 5. This density sensor 9 is a reflection-type optical sensor.

A cleaning unit 10 is, for example, a cleaning roller, and removes residual toner on the intermediate transfer belt 5.

Figure 2:
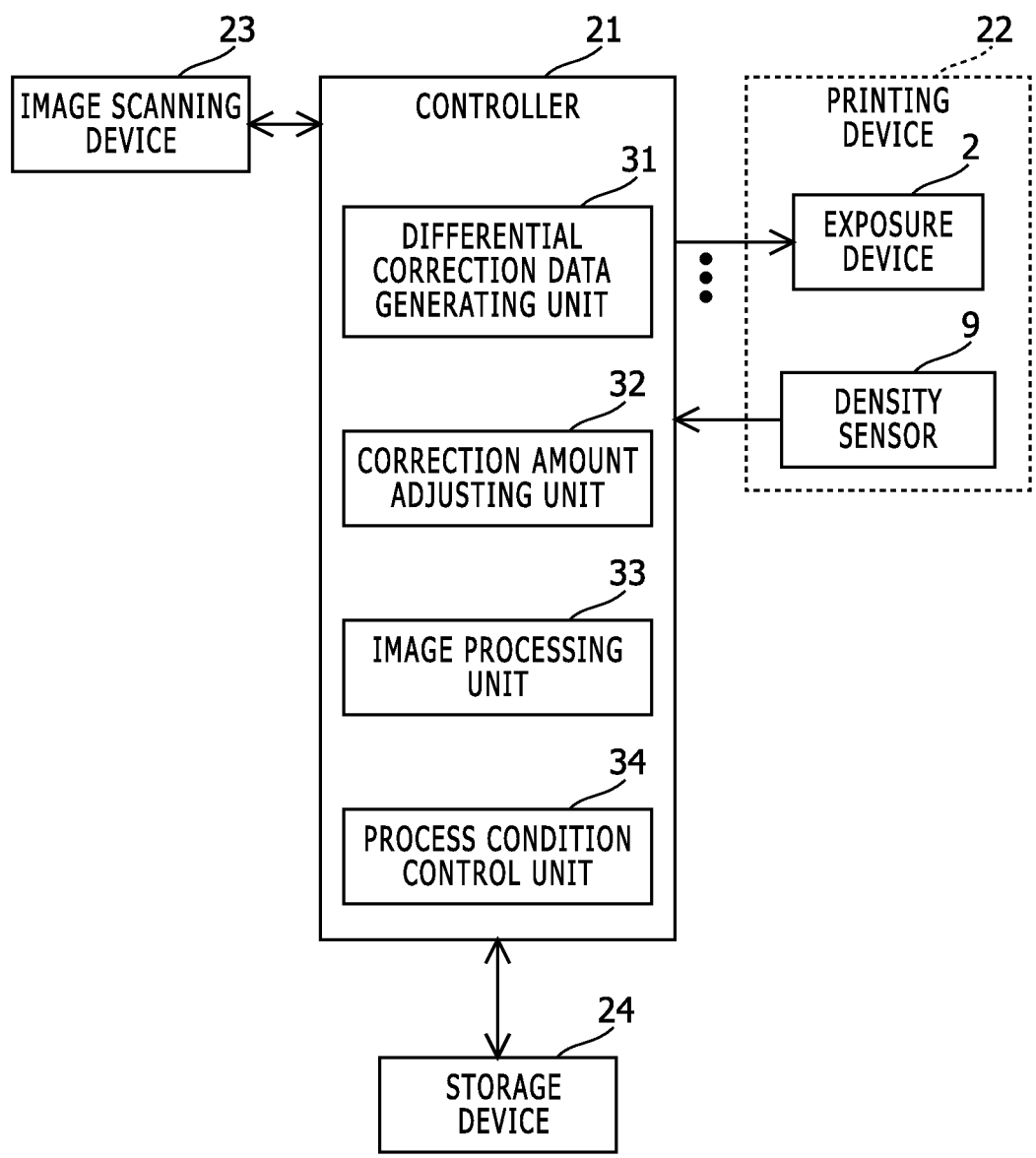
FIG. 2 shows a block diagram that indicates an electronic configuration of the image forming apparatus in the embodiment according to the present disclosure.

FIG. 2 shows a block diagram that indicates an electronic configuration of the image forming apparatus in the embodiment according to the present disclosure.

As shown in FIG. 2, this image forming apparatus includes a controller 21, a printing device 22, an image scanning device 23, and a storage device 24.

The controller 21 includes a computer, an ASIC (Application Specific Integrated Circuit) and/or the like and, on the basis of software and/or hardware thereof, controls an internal device inside of the image forming apparatus, and acts as sorts of processing units.

The printing device 22 is an internal device that includes the mechanical configuration shown in FIG. 1 and thereby prints an image based on image data for which the image processing unit 33 has performed image processing in the controller 21. The printing device 22 is capable of printing at plural linear velocities.

The image scanning device 23 is an internal device that optically scans a document image of a document and generates color image data of the document image.

The storage device 24 is a non volatile storage device such as a flash memory, and stores sorts of data required for correction of a density characteristic, such as differential correction data mentioned below.

Further, the controller 21 acts as a differential correction data generating unit 31, a correction amount adjusting unit 32, an image processing unit 33, and a process condition control unit 34.

In manual density characteristic adjustment based on test charts, the differential correction data generating unit 31 (a) causes the printing device 22 to print a test chart at a reference linear velocity (e.g. full speed) among the plural linear velocities (e.g. full speed, half speed, ¼ speed and the like) and a test chart at another linear velocity among the plural linear velocities, (b) causes the image scanning device 23 to scan images of the printed test charts, (c) measures a density characteristic at the reference linear velocity and a density characteristic at the another linear velocity on the basis of the scanning result of the images of the test charts, and (d) generates differential correction data on the basis of the density characteristic at the reference linear velocity and the density characteristic at the another linear velocity. Here, the differential correction data is a difference between a correction amount for the density characteristic at the reference linear velocity and a correction amount for the density characteristic at the another linear velocity.

The differential correction data includes at least one of: (a) a difference between gradation correction data at the reference linear velocity and gradation correction data at the another linear velocity, and (b) a difference between a development process condition (development bias or the like) at the reference linear velocity and a development process condition at the another linear velocity.

In this embodiment, the differential correction data generating unit 31 (a) generates temporary gradation correction data so as to make the density characteristic at the reference linear velocity be linear with changing a maximum density of the density characteristic at the reference linear velocity to a reference maximum density less than the maximum density; (b) generates basic gradation correction data so as to make the density characteristic at the reference linear velocity be linear with keeping a maximum density of the density characteristic at the reference linear velocity; and (c) generates additional gradation correction data at the reference linear velocity so as to make gradation correction based on the basic gradation correction data and the additional gradation correction data at the reference linear velocity be the same as gradation correction based on the temporary gradation correction data. Here, the additional gradation correction data is used for additional gradation correction performed after gradation correction based on the basic gradation correction data.

In this embodiment, a combination of the basic gradation correction data and the additional gradation correction data at the reference linear velocity is set to the gradation correction data at the reference linear velocity.

Further, the differential correction data generating unit 31 (d) measures a density characteristic at the another linear velocity on the basis of a test chart for which gradation correction has been performed using the basic gradation correction data and the additional gradation correction data at the reference linear velocity; and (e) measures gradation correction data at the another linear velocity so as to make a density characteristic at the another linear velocity be linear with changing a maximum density of the measured density characteristic at the another linear velocity to the reference maximum density, and sets the differential correction data as the measured gradation correction data at the another linear velocity.

In this embodiment, a combination of the basic gradation correction data, the additional gradation correction data at the reference linear velocity and the differential correction data is set to the gradation correction data at the another linear velocity.

In automatic calibration, the correction amount adjusting unit 32 causes the printing device to form an adjustment toner pattern on the intermediate transfer belt 5 in the printing device at the reference linear velocity, measures a density of the adjustment toner pattern formed on the intermediate transfer belt 5 using the density sensor 9 in the printing device 22 and thereby measures a density characteristic at the reference linear velocity, and adjusts a correction amount corresponding to the density characteristic at the reference linear velocity on the basis of the measured density characteristic at the reference linear velocity.

It should be noted that the correction amount adjusting unit 32 automatically performs adjustment of the additional gradation correction data (i.e. the automatic calibration) when adjustment timing based on a predetermined schedule comes. In addition, when detecting an adjustment request based on an operation by a user or a service person, the correction amount adjusting unit 32 may also perform adjustment of the additional gradation correction data (i.e. the automatic calibration).

The correction amount adjusting unit 32 (d) measures the density characteristic at the reference linear velocity using the basic gradation correction data in the aforementioned manner, and (e) adjusts the additional gradation correction data at the reference linear velocity on the basis of the density characteristic at the reference linear velocity. The correction amount adjusting unit 32 does not adjust the basic gradation correction data but adjusts the additional gradation correction data at the reference linear velocity so as to make a maximum density after gradation correction based on the basic gradation correction data and the additional gradation correction data at the reference linear velocity be the same as the reference maximum density.

The image processing unit 33 performs correction of a density characteristic (i.e. gradation characteristic) as a gamma correction to the image data. The image processing unit 33 (a) for printing at the reference linear velocity, performs correction of a density characteristic of a printing image on the basis of the correction amount (i.e. the gradation correction data) at the reference linear velocity, and (b) for printing at the another linear velocity, performs correction of a density characteristic of a printing image on the basis of the correction amount (i.e. the gradation correction data) at the reference linear velocity and the differential correction data.

The image processing unit 33 performs gradation correction of the printing image on the basis of the basic gradation correction data and the additional gradation correction data at the reference linear velocity for printing at the reference linear velocity, and performs gradation correction of the printing image on the basis of the basic gradation correction data, the additional gradation correction data at the reference linear velocity, and the differential correction data for printing at the another linear velocity.

The process condition control unit 34 adjusts a development process condition (e.g. development bias or the like) and thereby performs correction of the density characteristic (e.g. uppermost density in the development process). The process condition control unit 34 performs correction of the density characteristic of the printing image on the basis of a correction amount at the reference linear velocity (i.e. a correction amount from a reference value of the development process condition) for printing at the reference linear velocity, and performs correction of the density characteristic of the printing image on the basis of the correction amount at the reference linear velocity (i.e. the correction amount from a reference value of the development process condition) and the differential correction data for printing at the another linear velocity.

The following part explains a behavior of the aforementioned image forming apparatus.

(1) Generating Gradation Correction Data and Differential Correction Data

Figure 3:
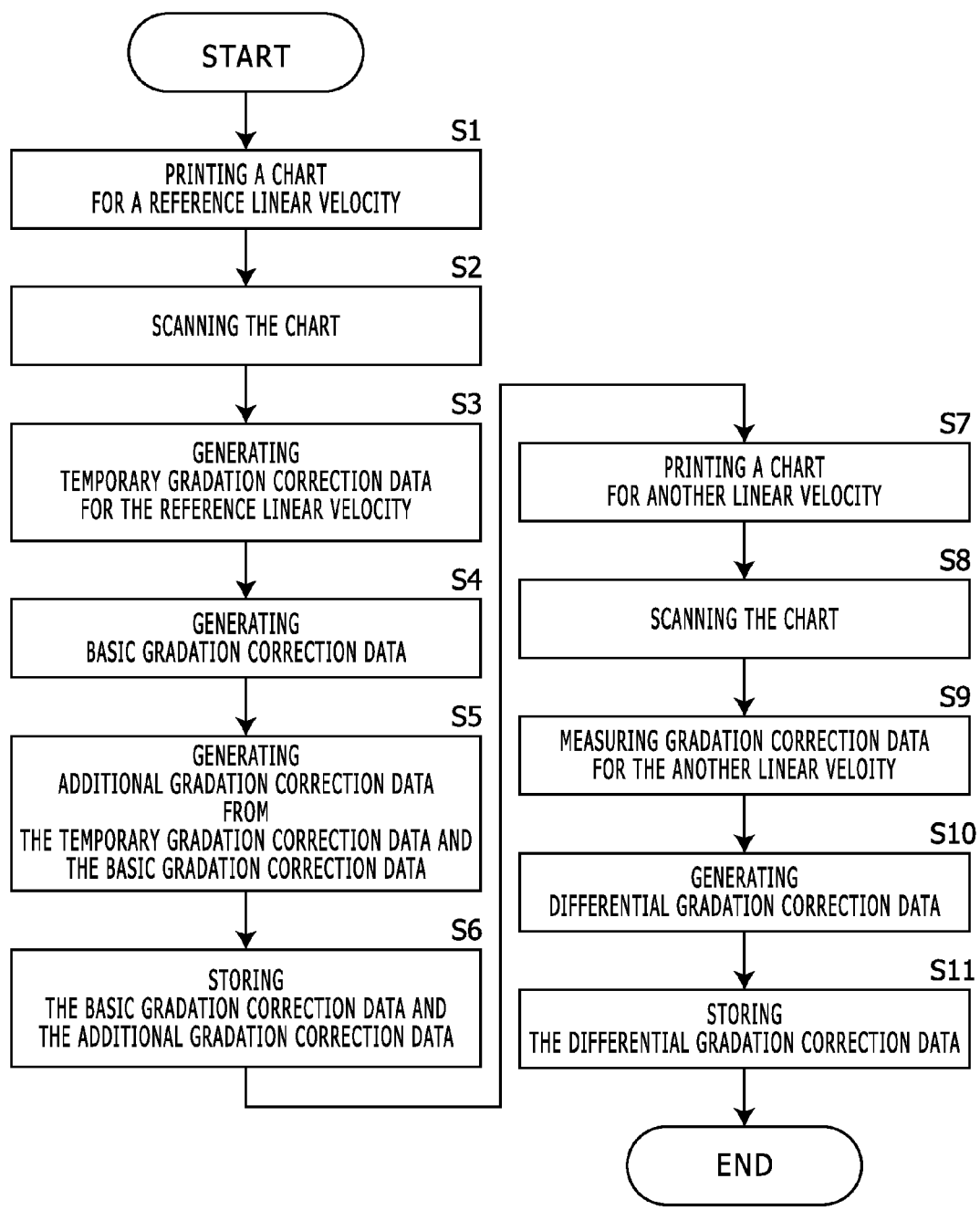
FIG. 3 shows a flowchart that explains a behavior of the image forming apparatus shown in FIGS. 1 and 2 when generating gradation correction data.
Figure 5A:
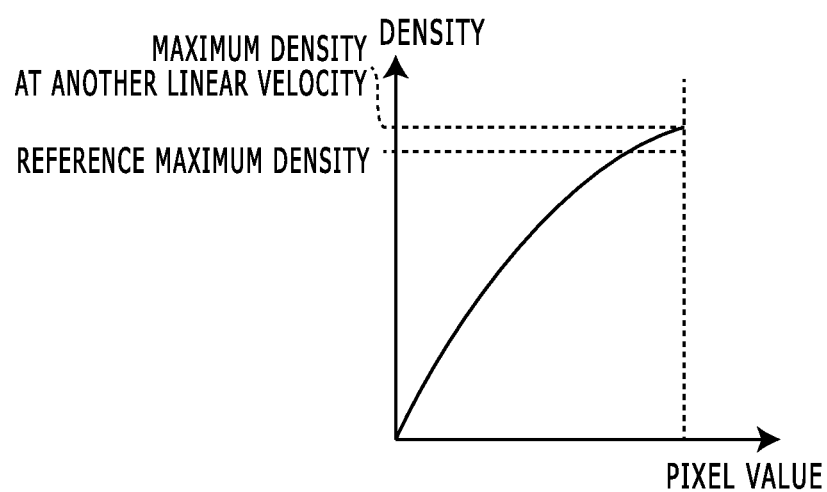
FIGS. 5A and 5B show diagrams that explain a process performed by the image forming apparatus shown in FIGS. 1 and 2 when generating gradation correction data at another linear velocity.
Figure 5B:
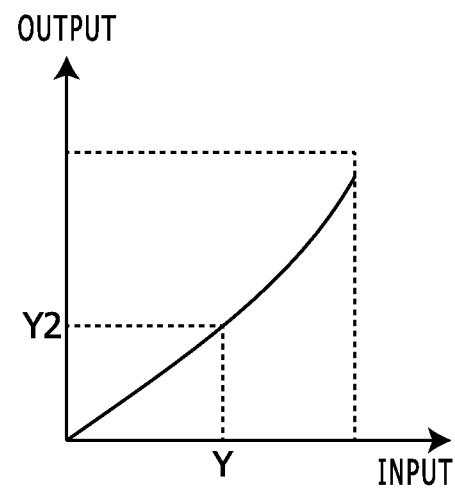

FIG. 3 shows a flowchart that explains a behavior of the image forming apparatus shown in FIGS. 1 and 2 when generating gradation correction data. FIGS. 4A to 4F show diagrams that explain a process performed by the image forming apparatus shown in FIGS. 1 and 2 when generating the gradation correction data at the reference linear velocity. FIG. 4A shows a diagram that indicates an example of a relationship between pixel values and toner densities when generating the gradation correction data on the basis of a test chart. FIG. 4B shows a diagram that indicates a linear relationship between pixel values and toner densities when setting the maximum density as the reference maximum density. FIG. 4C shows a diagram that indicates an example of temporary gradation correction data obtained from the relationship between pixel values and toner densities shown in FIG. 4A and the goal relationship shown in FIG. 4B. FIG. 4D shows a diagram that indicates a linear relationship between pixel values and toner densities for keeping the maximum density. FIGS. 4E and 4F show diagrams that indicate an example of the basic gradation correction data and the additional gradation correction data. FIGS. 5A and 5B show diagrams that explain a process performed by the image forming apparatus shown in FIGS. 1 and 2 when generating the gradation correction data at another linear velocity. FIG. 5A shows a diagram that indicates an example of a relationship between pixel values and toner densities when generating the gradation correction data on the basis of a test chart. FIG. 5B shows a diagram that indicates an example of the temporary gradation correction data at the another linear velocity.

The differential correction data generating unit 31 performs manual density characteristic adjustment based on a test chart at each of the reference linear velocity and the another linear velocity, and determines a difference between the adjustment results at the both linear velocity as the differential correction data.

In this embodiment, as mentioned below, the differential correction data generating unit 31 determines the differential correction data. It should be noted that in this embodiment the differential correction data is set as the difference of the gradation correction data, and in addition, the differential correction data may include a difference between setting values of the development process condition corresponding to the correction amounts of the maximum density.

Firstly, the differential correction data generating unit 31 controls the printing device 22 and thereby causes it to print a test chart on a paper sheet at the reference linear velocity (e.g. full speed) without gradation correction (in Step S1). The test chart includes patches of 64 gradation levels for each color of Black, Magenta, Cyan and Yellow.

Subsequently, after on the image scanning device 23 a user puts the paper sheet on which the test chart has been printed at the reference linear velocity, the differential correction data generating unit 31 controls the image scanning device 23 and thereby causes it to scan an image of the test chart printed on the paper sheet and obtains RGB image data of each patch in the test chart (in Step S2). Consequently, a density characteristic at the reference linear velocity as shown in FIG. 4A for example is obtained for each color of Black, Magenta, Cyan and Yellow.

For each color, the differential correction data generating unit 31 generates temporary gradation correction data as shown in FIG. 4C for the correction from the obtained density characteristic to the density characteristic as shown in FIG. 4B (in Step S3), and generates basic gradation correction data as shown in FIG. 4E for the correction from the obtained density characteristic to the density characteristic as shown in FIG. 4D (in Step S4).

Subsequently, for each color, the differential correction data generating unit 31 generates additional gradation correction data at the reference linear velocity as shown in FIG. 4F on the basis of the temporary gradation correction data at the reference linear velocity and the basic gradation correction data. In this process, the additional gradation correction data is generated so that where an output t corresponds to an input X in the input-output relationship of the basic gradation correction data and an output Y of the additional gradation correction data is obtained when the output t is set as an input of the additional gradation correction data, the output Y of the additional gradation correction data gets equal to an output Y of the temporary gradation correction data to the input X.

The differential correction data generating unit 31 stores the basic gradation correction data and the additional gradation correction data at the reference linear velocity in the storage device 24 (in Step S6).

In addition, the differential correction data generating unit 31 controls the printing device 22 and thereby causes it to print a test chart on a paper sheet at another linear velocity (e.g. half speed) (in Step S7). Here this test chart is obtained by performing gradation correction for the aforementioned original test chart on the basis of the basic gradation correction data and the additional gradation correction data at the reference linear velocity (in Step S7).

Subsequently, after on the image scanning device 23 the user puts the paper sheet on which the test chart has been printed at the another linear velocity, the differential correction data generating unit 31 controls the image scanning device 23 and thereby causes it to scan an image of the test chart printed at the another linear velocity (here half speed) on the paper sheet and obtains RGB image data of each patch in the test chart (in Step S8). Consequently, a density characteristic at the another linear velocity as shown in FIG. 5A for example is obtained for each color of Black, Magenta, Cyan and Yellow.

For each color, the differential correction data generating unit 31 measures gradation correction data at the another linear velocity as shown in FIG. 5B for the correction from the obtained density characteristic to the density characteristic as shown in FIG. 4B (in Step S9), sets the measured gradation correction data to differential correction data (in Step S10), and stores the differential correction data in the storage device 24 (in Step S11).

Here the test chart is printed by applying the gradation correction data at the reference linear velocity. Alternatively, the following process may be performed, that is, (a) printing the test chart without the gradation correction, (b) measuring the temporary gradation correction data at the another linear velocity, (c) determining a difference between the temporary gradation correction data at the another linear velocity and the basic gradation correction data (i.e. determining the additional gradation correction data at the another linear velocity), and (d) setting the differential correction data as a difference between the additional gradation correction data at the reference linear velocity and the additional gradation correction data at the another linear velocity.

Meanwhile, when printing a printing image based on a printing request, if the reference linear velocity is specified, then the image processing unit 33 (*a*) reads the basic gradation correction data and the additional gradation correction data at the reference linear velocity from the storage device 24, (b) sets a pixel value to an input X, (c) sets an output t for the input X in the basic gradation correction data to an input of the additional gradation correction data, and (d) sets an output Y for the input t in the additional gradation correction data to a pixel value after the gradation correction.

Further, if another linear velocity is specified, then the image processing unit 33 (*a*) reads the basic gradation correction data, the additional gradation correction data at the reference linear velocity and the differential correction data from the storage device 24, (b) sets a pixel value to an input X, (c) sets an output t for the input X in the basic gradation correction data to an input of the additional gradation correction data, and (d) adjusts an output Y for the input t in the additional gradation correction data to a value Y2 using the differential correction data and sets the value Y2 to a pixel value after the gradation correction.

(2) Adjusting the Gradation Correction Data and the Like

Automatic calibration is performed at predetermined timing, and adjusts a correction amount of the density characteristic such as a correction amount of the gradation correction data, the correction amount of the development process condition or the like.

Figure 6:
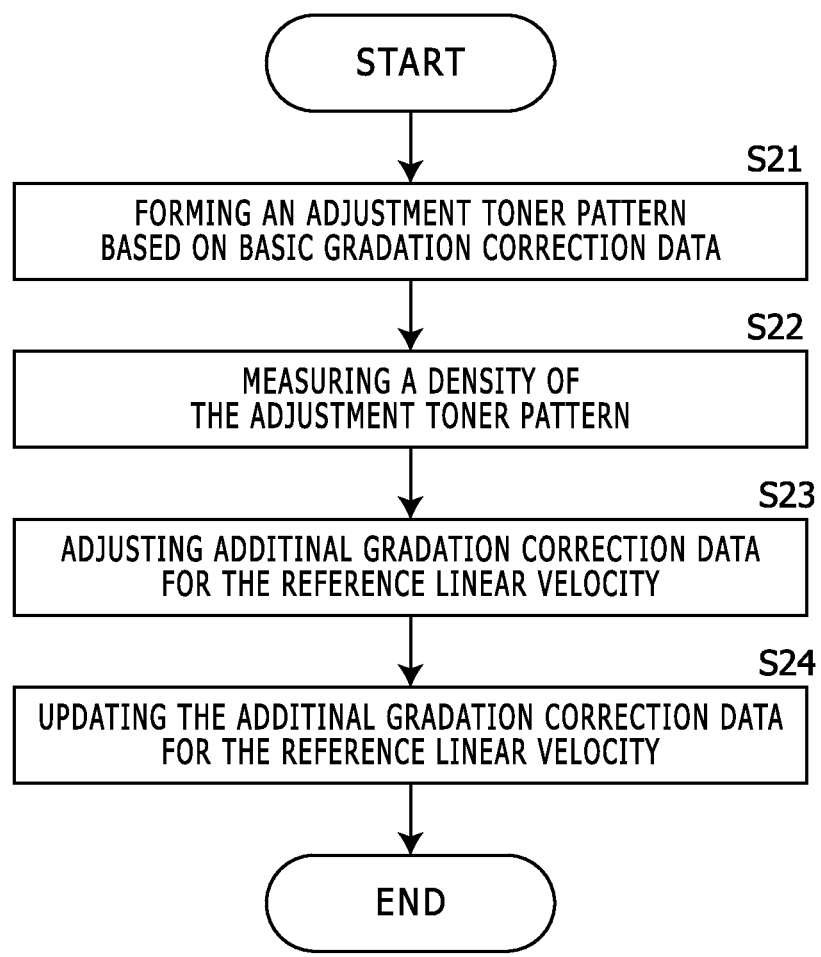
FIG. 6 shows a flowchart that explains a behavior of the image forming apparatus shown in FIGS. 1 and 2 when adjusting gradation correction data.
Figure 7B:
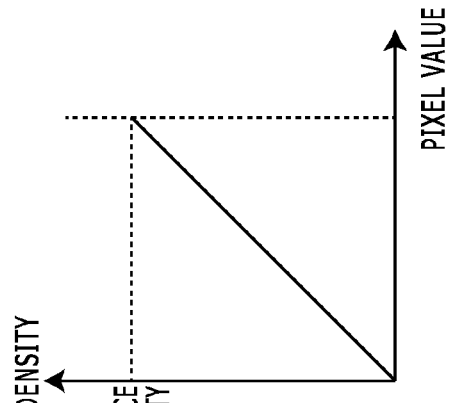
FIGS. 7A to 7D show diagrams that explain a process performed by the image forming apparatus shown in FIGS. 1 and 2 when adjusting gradation correction data.
Figure 7A:
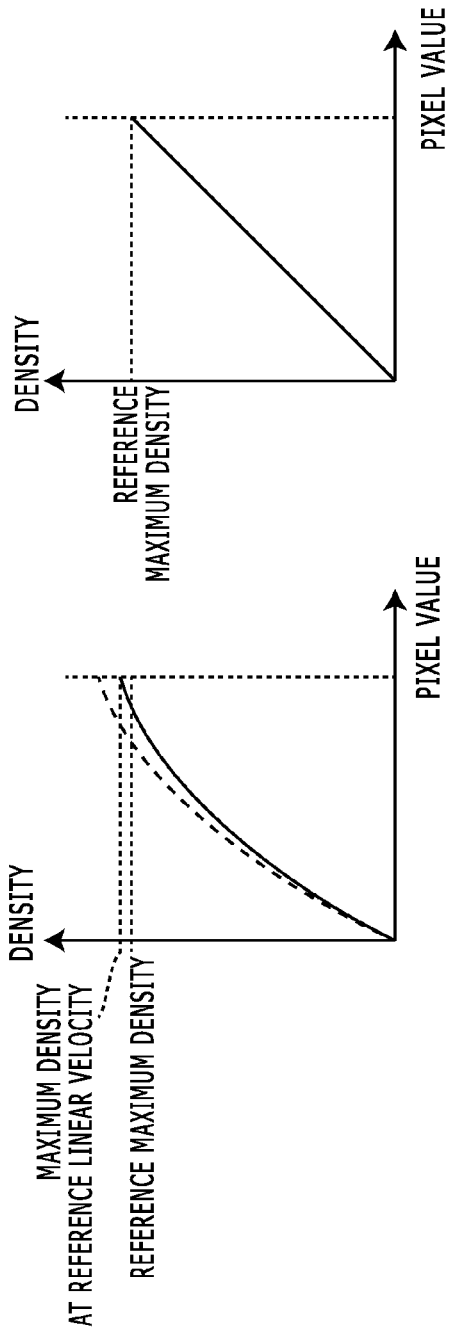
Figure 7D:
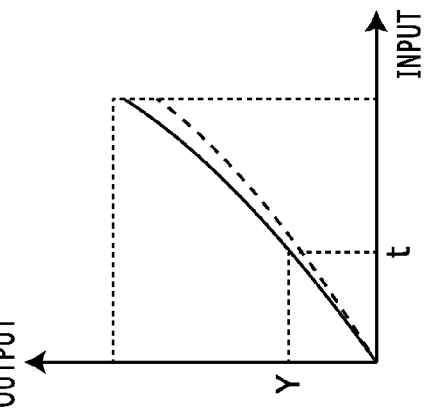
Figure 7C:
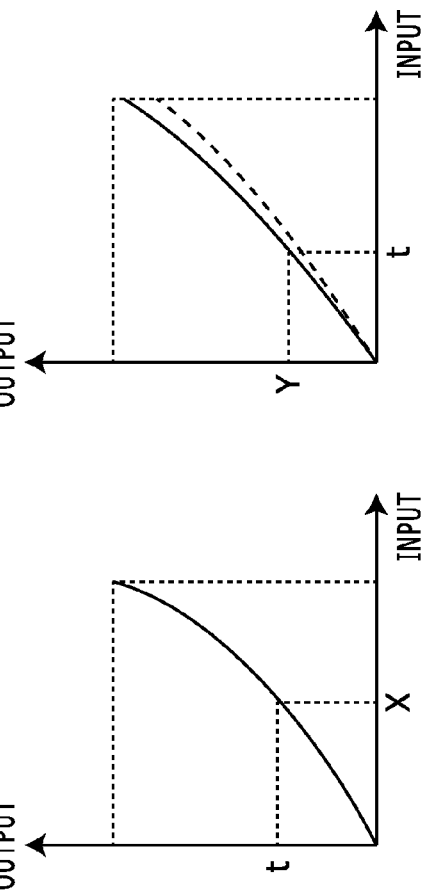

FIG. 6 shows a flowchart that explains a behavior of the image forming apparatus shown in FIGS. 1 and 2 when adjusting gradation correction data. FIGS. 7A to 7D show diagrams that explain a process performed by the image forming apparatus shown in FIGS. 1 and 2 when adjusting gradation correction data. FIG. 7A shows a diagram that indicates a relationship between a pixel value and a toner density after the density characteristic changes. FIG. 7B shows a diagram that indicates a linear relationship between pixel values and toner densities when setting the maximum density as the reference maximum density. FIGS. 7C and 7D show diagrams that indicate an example of the basic gradation correction data and the adjusted additional gradation correction data.

Firstly, the correction amount adjusting unit 32 controls the printing device 22 and thereby causes it to form an adjustment toner pattern based on the basic gradation correction data at the reference linear velocity on the intermediate transfer belt 5 (in Step S21). The adjustment toner pattern includes patches of 8 gradation levels for each color of Black, Magenta, Cyan and Yellow, less than the gradation levels of the test chart.

Thus, when adjusting the gradation correction data, the gradation correction is performed on the basis of only the basic gradation correction data without the additional gradation correction data, and thereby a pixel value of each patch is determined.

Subsequently, the correction amount adjusting unit 32 measures a density of each patch in the adjustment toner pattern using the density sensor 9 of the printing device 22 (in Step S22).

The correction amount adjusting unit 32 adjusts the additional gradation correction data at the reference linear velocity on the basis of the measured density (in Step S23).

For example, if densities in the density characteristic decrease from the dashed line to the solid line in FIG. 7A, then in order to obtain the density characteristic as shown in FIG. 7B on the basis of the basic gradation correction data and the additional gradation correction data at the reference linear velocity, the additional gradation correction data is adjusted from the dashed line to the solid line shown in FIG. 7D without changing the basic gradation correction data (FIG. 7C).

Subsequently, the correction amount adjusting unit 32 updates the additional gradation correction data stored in the storage device 24 with the adjusted additional gradation correction data (in Step S24).

After the adjustment as well, when printing a printing image based on a printing request, if the reference linear velocity is specified, then the image processing unit 33 (*a*) reads the basic gradation correction data and the additional gradation correction data from the storage device 24, and (b) sets each pixel value to an input X, (c) sets an output t for the input X in the basic gradation correction data to an input of the additional gradation correction data, and (d) sets an output Y for the input t in the additional gradation correction data to a pixel value after the gradation correction.

Figure 9:
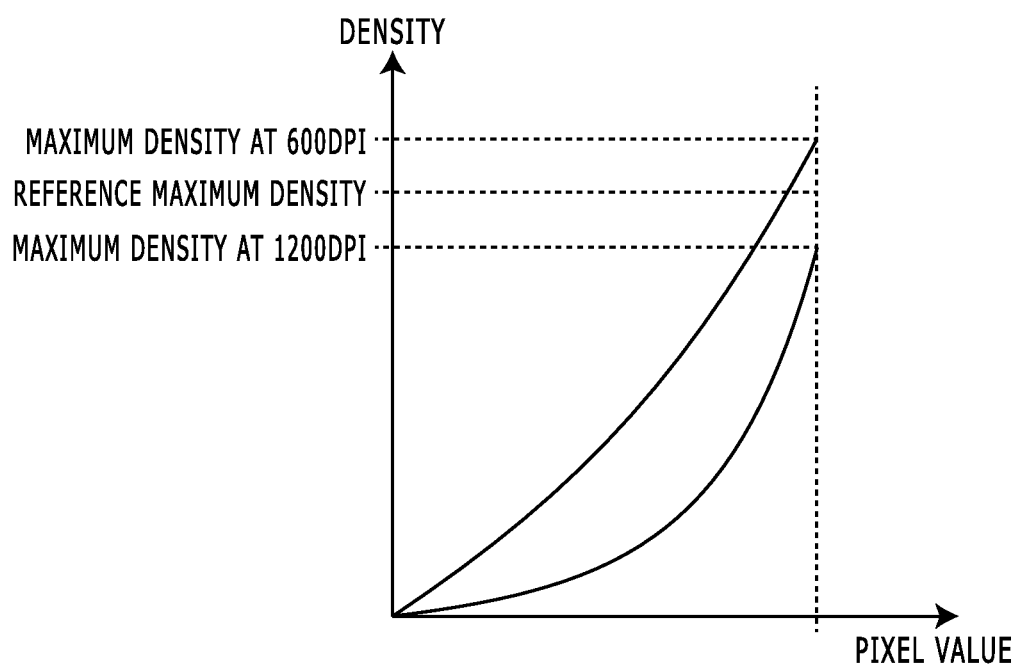
FIG. 9 shows a diagram that indicates an example of gradation characteristics at plural linear velocities.

Contrarily, if the another linear velocity is specified, then the image processing unit 33(*a*) reads the basic gradation correction data, the additional gradation correction data at the reference linear velocity and the differential correction data from the storage device 24, (b) sets a pixel value to an input X, (c) sets an output t for the input X in the basic gradation correction data to an input of the additional gradation correction data, and (d) adjusts an output Y for the input t in the additional gradation correction data to a value Y2 using the differential correction data and sets the value Y2 to a pixel value after the gradation correction. Thus, in addition to applying the differential correction data, the density characteristic at the another linear velocity is also corrected by the adjustment amount of the additional gradation correction data. Therefore, even in a case as shown in FIG. 9, the correction amount for the density characteristic is properly adjusted for each one of plural linear velocities.

In the aforementioned embodiment, the differential correction data generating unit 31 generates differential correction data that is a difference between a correction amount for a density characteristic at a reference linear velocity and a correction amount for a density characteristic at another linear velocity. The correction amount adjusting unit 32 causes the printing device 22 to form an adjustment toner pattern on the intermediate transfer belt 5 in the printing device 22 at the reference linear velocity, measures a density of the adjustment toner pattern formed on the intermediate transfer belt 5 using the density sensor 9 in the printing device 22 and thereby measures a density characteristic at the reference linear velocity, and adjusts a correction amount corresponding to the density characteristic at the reference linear velocity on the basis of the measured density characteristic at the reference linear velocity. The density characteristic correcting unit such as the image processing unit 33 or the process condition control unit 34 (a) for printing at the reference linear velocity, performs correction of a density characteristic of a printing image on the basis of the correction amount at the reference linear velocity, and (b) for printing at the another linear velocity, performs correction of a density characteristic of a printing image on the basis of the correction amount at the reference linear velocity and the differential correction data.

Consequently, in the image forming apparatus including the printing device capable of printing at plural process linear velocities (i.e. printing linear velocities), calibration at the reference linear velocity properly adjusts a density characteristic at the reference linear velocity and a density characteristic at another linear velocity.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the intermediate transfer belt 5 is used as an intermediate transfer member, and for another type of an intermediate transfer member, the adjustment of the gradation correction data can be performed as well.

What is claimed is:

1. An image forming apparatus, comprising:
   a printing device capable of printing at plural linear velocities;
   an image scanning device;
   a differential correction data generating unit configured to (a) cause the printing device to print a test chart at a reference linear velocity among the plural linear velocities and a test chart at another linear velocity among the plural linear velocities, (b) cause the image scanning device to scan images of the printed test charts, (c) measure a density characteristic at the reference linear velocity and a density characteristic at the another linear velocity on the basis of the scanning result of the images of the test charts, and (d) generate differential correction data on the basis of the density characteristic at the reference linear velocity and the density characteristic at the another linear velocity, the differential correction data being a difference between a correction amount for the density characteristic at the reference linear velocity and a correction amount for the density characteristic at the another linear velocity;
   a correction amount adjusting unit configured to (a) form an adjustment toner pattern at the reference linear velocity on an intermediate transfer member in the printing device, (b) measure a density of the adjustment toner pattern formed on the intermediate transfer member using a density sensor in the printing device and thereby measure a density characteristic at the reference linear velocity, and (c) adjust a correction amount for the density characteristic at the reference linear velocity on the basis of the measured density characteristic at the reference linear velocity; and
   a density characteristic correcting unit configured to (a) for printing at the reference linear velocity, perform correction of a density characteristic of a printing image on the basis of the correction amount at the reference linear velocity, and (b) for printing at the another linear velocity, perform correction of a density characteristic of a printing image on the basis of the correction amount at the reference linear velocity and the differential correction data.

2. The image forming apparatus according claim 1, wherein the differential correction data includes at least one of: (a) a difference between gradation correction data at the reference linear velocity and gradation correction data at the another linear velocity, and (b) a difference between a development process condition at the reference linear velocity and a development process condition at the another linear velocity.

3. The image forming apparatus according claim 2, wherein:
   the density characteristic correcting unit includes at least one of an image processing unit and a process condition control unit;
   the image processing unit (a) performs gradation correction of the printing image on the basis of the gradation correction data at the reference linear velocity for printing at the reference linear velocity, and (b) performs gradation correction of the printing image on the basis of the gradation correction data at the reference linear velocity and the differential correction data for printing at the another linear velocity; and
   the image processing unit (a) performs gradation correction of the printing image on the basis of a development process condition at the reference linear velocity for printing at the reference linear velocity, and (b) performs gradation correction of the printing image on the basis of the development process condition at the reference linear velocity and the differential correction data for printing at the another linear velocity.

4. The image forming apparatus according claim 1, wherein:
   the differential correction data generating unit
   (a) generates temporary gradation correction data so as to make the density characteristic at the reference linear velocity be linear with changing a maximum density of the density characteristic at the reference linear velocity to a reference maximum density less than the maximum density;

(b) generates basic gradation correction data so as to make the density characteristic at the reference linear velocity be linear with keeping a maximum density of the density characteristic at the reference linear velocity;

(c) generates additional gradation correction data at the reference linear velocity, the additional gradation correction data being used for additional gradation correction performed after gradation correction based on the basic gradation correction data, so as to make gradation correction based on the basic gradation correction data and the additional gradation correction data at the reference linear velocity be the same as gradation correction based on the temporary gradation correction data;

(d) measures a density characteristic at the another linear velocity on the basis of a test chart for which gradation correction has been performed using the basic gradation correction data and the additional gradation correction data at the reference linear velocity; and (e) measures gradation correction data at the another linear velocity so as to make a density characteristic at the another linear velocity be linear with changing a maximum density of the measured density characteristic at the another linear velocity to the reference maximum density, and sets the differential correction data as the measured gradation correction data at the another linear velocity;

the correction amount adjusting unit (f) measures the density characteristic at the reference linear velocity using the basic gradation correction data; and (g) adjusts the additional gradation correction data at the reference linear velocity on the basis of the density characteristic at the reference linear velocity; and the density characteristic correcting unit performs gradation correction of the printing image on the basis of the basic gradation correction data and the additional gradation correction data at the reference linear velocity for printing at the reference linear velocity, and performs gradation correction of the printing image on the basis of the basic gradation correction data, the additional gradation correction data at the reference linear velocity, and the differential correction data for printing at the another linear velocity.

* * * * *